Sept. 4, 1951
C. E. LINN
2,567,114
LATCH MECHANISM
Filed May 7, 1945
2 Sheets-Sheet 1
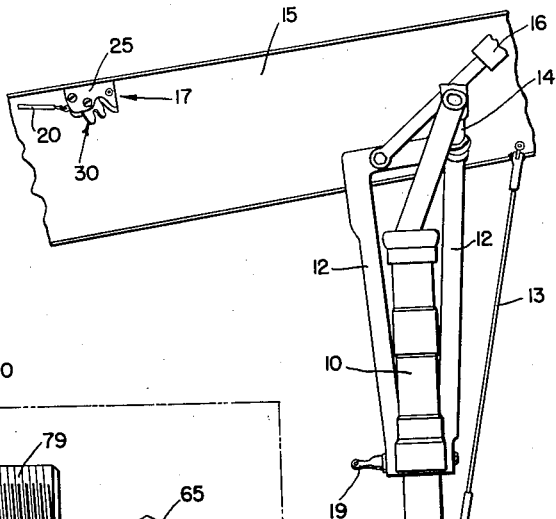
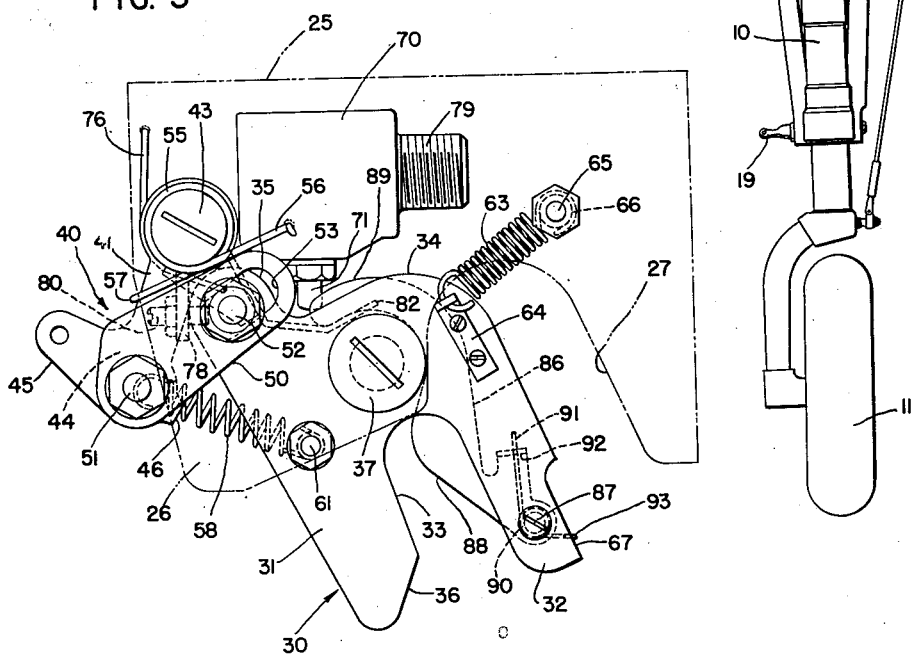
INVENTOR.
CLARENCE E. LINN
BY George F. Goodyear
ATTORNEY Sept. 4, 1951     C. E. LINN     2,567,114
LATCH MECHANISM
Filed May 7, 1945     2 Sheets-Sheet 2
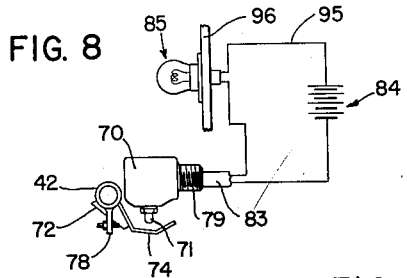
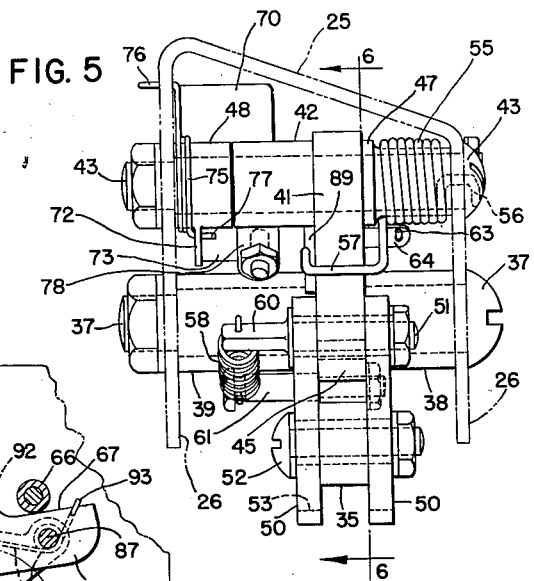
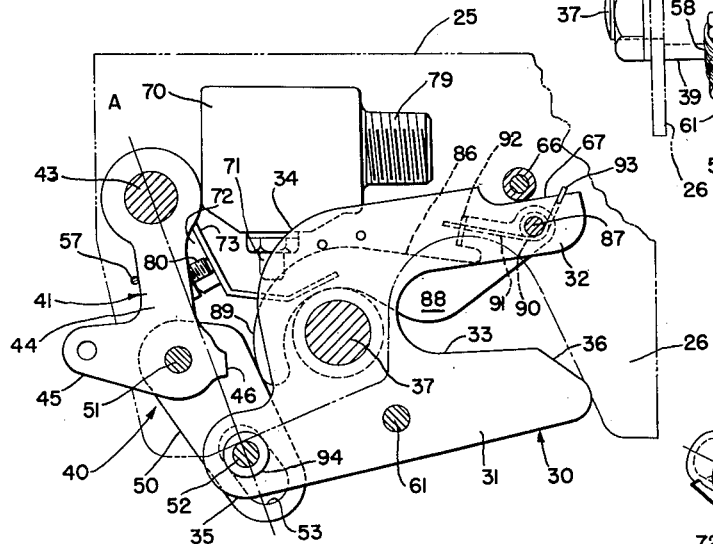
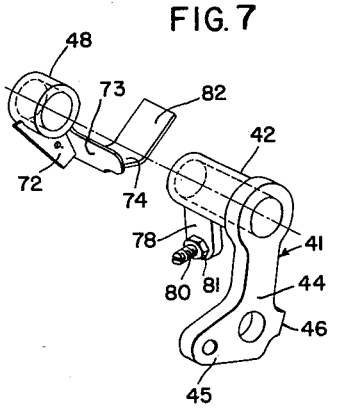
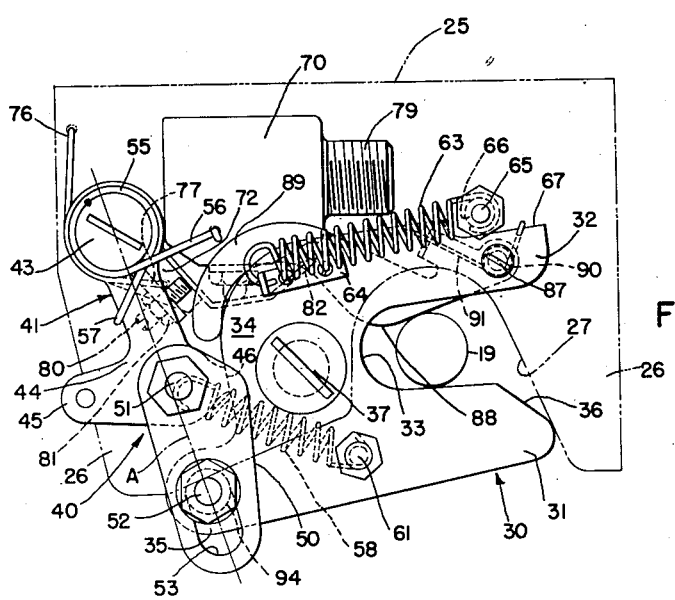
INVENTOR.
CLARENCE E LINN
BY George F. Goodyear
ATTORNEY Patented Sept. 4, 1951

2,567,114

UNITED STATES PATENT OFFICE 2,567,114

LATCH MECHANISM

Clarence E. Linn, Newark, Ohio, assignor to Curtiss-Wright Corporation, a corporation of Delaware Application May 7, 1945, Serial No. 592,368

9 Claims. (Cl. 244—102)

The subject invention relates to aircraft landing gear latching means and means to indicate its latched condition.

It is a general object hereof to provide a novel and greatly improved landing gear latching means which will be actuable by the landing gear movement to a locked position.

Another object resides in the provision of an indicating control means for use with the latching means whereby the latched condition of the latter can be made known.

A further object of this invention may be found in the arrangement of the several parts and elements of the latch mechanism and in the means for operating the indicating means.

Other objects and advantages will be more particularly pointed out in connection with the following description of a preferred form and arrangement of the invention as disclosed in the accompanying drawing.

Figure 1 of the drawing is a general front elevational view of a landing gear assembly in which the present latch means has been incorporated.

Figure 2 is a view similar to Figure 1 but showing the landing gear in its retracted and latch position.

Figure 3 is an enlarged elevational view of the latch means in its open or unlatched condition, the mounting frame being indicated in outline for clarity of details.

Figure 4 is a view of the latch means when in its properly latched position, the view in other respects being similar to that of Figure 3.

Figure 5 is an end elevational view of the latch means of Figure 4.

Figure 6 is a sectional elevational view similar to that of Figure 4 but as seen at line 6—6 of Figure 5, the latch being shown in the improperly actuated condition to illustrate its operational features.

Figure 7 is an exploded view in perspective of the means and mechanism provided for operating the indicating device associated with the present latch.

Figure 8 is a schematic wiring diagram of a simple electrical circuit associated with the latching means.

Referring to Figures 1 and 2, the landing gear, including a shock strut 10, wheel 11, brace struts 12, shortening cable 13 for collapsing the shock strut 10 upon retraction, is pivoted at 14 on the wing structure 15 for movement from its extended position to its retracted position. An actuating unit 16 moves the gear, while the presently preferred latch means 17 fixed on the wing 15 is engaged by a latch hook means 19 carried by the shock strut 10. A cable 20 attached to a lug portion of one of the movable elements of the latch, later to be pointed out, is provided for releasing the latter when the gear is to be extended.

In Figures 3 and 4 particularly, and in the remaining views, the latch 17 is shown as operatively mounted in a suitable frame or bracket 25 attached to a part of the wing structure. This frame 25 is formed with spaced side plates or walls 26 in which the several pivotally mounted elements of the latch mechanism are operatively supported, all as will be described presently. It will be noted that the side walls 26 are cut out or notched as at 27 to permit the hook 19 free movement into engagement with its catch element. This catch element is shown at 30 and is formed of a single flat part having furcations 31 and 32 providing a notch 33 therebetween, a body 34 and an operating arm 35 extending oppositely from the furcation 31. In addition the furcation 31 is suitably beveled at 36 so that the hook 19 may be more easily guided into the notch 33 during the latching operation. The catch 30 is pivoted on a shaft 37 carried by the side walls 26 and is held against axial movement by a pair of spacer sleeves 38 and 39 mounted on the shaft at either side of the catch (Figure 5).

A toggle mechanism 40, operatively associated with the catch 30, comprises an operating link 41 having an elongated sleeve bearing 42 for pivotally mounting the link on a shaft 43 carried by the frame side walls 26, a depending arm 44, a lug element 45 and a nose boss 46 directed substantially oppositely to the lug. The link 41 is located in the same plane with the catch 30 by means of spacer sleeves 47 and 48 carried by the shaft 43. Figures 5 and 7 disclose the details of the link 41 as to form and mounting arrangement. In addition to the operating link 41, the toggle mechanism includes a pair of idler links 50 which are mounted on each side of the catch 30 and link 41. The idler links are pivotally connected to the link arm 44 by a pivot element 51 and to the arm 35 of the catch by a pivot element 52. It will be noted that the ends of each idler link associated with the pivot 52 have been formed to provide an elongated slot 53 whereby a certain degree of lost motion or over travel is permitted for these links with respect to the catch arm 35, or vice versa, depending upon the point of application of an external load to the latch means. Moreover, the elongated slot will act to relieve the toggle links of any load carrying effort during the latching of the landing gear.

As viewed in Figures 3 and 4, for example, the toggle link 41 is constantly urged for pivotal movement in a counterclockwise direction by a torsion spring 55 which is anchored at 56 in the adjacent wall 26, the coiled body of which is mounted on the sleeve spacer 47 and the load arm 57 is suitably formed to contact the outer edge surface of the link. In addition to this torsion spring, a tension spring 58, disposed between an anchor extension 60 on pivot element 51 and a suitable projecting stud or anchor element 61 on catch 30, is effective to urge the link 41 in the same direction as does torsion spring 55. However, the spring 58 also acts to urge the catch in a clockwise direction of rotation about its pivot 37. The tension spring 58 shall be hereinafter referred to as the "toggle spring," while the torsion spring 55 shall be termed a "booster spring." A second booster spring 63 (Figure 3) is provided for the catch 30 in order to assure its movement to full open position upon release of the toggle mechanism. This spring 63 is disposed between an anchor bracket 64 secured to the catch 30 and an anchor stud means 65 mounted on and extending between the side walls 26 of frame 25. The stud carries a sleeve element 66 which permits free alignment action of the booster spring and also acts as a stop means against which the furcation 32 of catch 30 bears in its closed or latched position (see Figure 4). The closed position of the catch is determined by a carefully machined surface 67 formed at the outer edge portion of the furcation 32, as clearly indicated in Figures 3 and 4.

The proper or improper operation of the above described latch means 17 is indicated through an electrical circuit control switch 70 mounted on the side wall 26 adjacent the pivot 43 and on the side to which the sleeve bearing 42 for toggle link 41 extends. This control switch has an actuation element or button means 71 directed into the path of movement of means now to be described in connection with Figures 3 to 7. Spacer means 48 (Figure 5) supports an arm element 72 which is formed with a laterally directed portion 73 and a contact element 74 for cooperation with the switch button 71. The arm 72 is urged away from contact with the button 71 or in a clockwise direction, as viewed in Figures 3, 4 or 6, by a torsion spring 75 (Figure 5). This spring is anchored at end 76 in the adjacent side wall 26 while the opposite end 77 is anchored in the arm 72.

The means provided for actuating arm 72 comprises, in this case, a depending arm 78 on sleeve bearing 42 which is thus movable with the operating link 41 of the toggle mechanism. An adjustment screw 80 and lock nut 81 mounted on the lower end of this arm 78 determines the extent of movement of the arm 72 and the point in the movement of the toggle links 41 and 50 at which the switch is actuated to close its circuit later to be described, whereby to indicate that the toggle is in locked or over center position. The opposite movement of arm 72 is checked by contact of extension 82 on the spacer sleeve 39 carried by the shaft 37 (see Figure 3). Circuit lead wires are connected in any suitable manner to the switch 70 at the threaded adapter receiving boss 79 which constitutes a portion of the switch housing.

In order that the switch 70 remain inoperative until the toggle mechanism is properly conditioned to secure the catch 30 in locked position, there is provided a lockout means 86, pivotally mounted at 87 on furcation 32, which is provided with a cam projection 88 extending partially across and at one side of slot 33 and an arcuate finger 89 which extends about the sleeve spacer 39 on shaft 37 and into the path of movement of one of the idler links 50 (see Figure 6). This lockout means is normally urged in a counterclockwise direction by means of a torsion spring 90, one end 91 being anchored in a flanged portion 92 of the lockout structure and the opposite end 93 being hooked over the recessed face 67 of the furcation 32.

The latch operation for securing the landing gear in retracted position is initiated upon movement of the hook 19 into the slot 33, guided by the face 36 on furcation 31 (Figure 3). Upward movement of the hook will cause the catch 30 to pivot counterclockwise toward the position thereof as shown in Figure 4. During this pivotal movement the toggle links 41 and 50 will adjust themselves by the freedom of movement permitted by slots 53 in each of the latter links 50. During the first part of the travel of catch 30 the toggle mechanism will be moved from its folded position to a position of extension approximating that shown in Figure 6 where the pivot means 43 and 52 are approaching a maximum spaced condition. Further movement of the catch will then increase the load of spring 58 on pivot 51 sufficiently to cause the link 41 and links 50 to snap through a dead centered position with respect to the pivots 43 and 52 as indicated in Figure 4 where the reference line A represents the dead center alignment of the toggle links. The torsion spring 55, at this time will boost or increase the force on the toggle to drive it into locked position.

Simultaneously upon the toggle mechanism approaching its dead center position, the arm 78 and adjustable element 80 will contact the arm 73 and carry the latter along for the remainder of the motion permitted or until the nose boss 46 on link 41 strikes the edge face of the catch body 34 (Figure 4). At this point the toggle mechanism is arrested and the switch button 71 fully depressed by the actuator arm portion 74. Also at this time the catch 30 is prevented from further movement by contact of the face 67 with stop means 66. The final locked condition of the latch 17 is clearly shown in Figure 4.

In Figure 8, the electrical circuit controlled by the switch 70 includes a two-wire cable 83 connected at 79 to the switch and extending to a battery 84 and a signal means 85. The circuit is completed by a lead 95 between the battery and signal means. The latter may be mounted on a panel 96 or other means.

What has been said concerning the normal and intended operation of the present latch means 17 is predicated upon the proper engagement of the hook 19 within the slot 33 and the resulting movement of the lockout means 86 to inoperative position upon contact at the cam 88 of the hook 19. When this occurs the finger 89 will be moved to an out-of-the-way position so as not to come between the link 50 and the edge face of the catch body 34. The inoperative position of the lockout means caused by the proper positionment of hook 19 is shown in Figure 4. Its initial position is as indicated in Figure 3.

Once the toggle mechanism has attained its over center locked position it will remain so until a releasing force is exerted upon the link 41 to cause the pivot means 51 to again move through the dead center axis A in a direction against the restraint of the toggle spring 58. Such a releasing force is exerted on the link 41 through the connection of cable 20 (Figures 1 and 2) with the lug 45. As soon as the pivot means 52 passes through the dead center axis A, booster spring 63 will then exert a restoring force on the catch 30 to move it to open position. During the last portion of the motion of catch 30 to open position the toggle spring 58 becomes active as a means for accelerating the folding action of the links 41 and 50. When in the open position (Figure 3) the catch 30 may move to a limited extent in a clockwise direction because of the slots 53 formed in idler links 50. Such movement is stopped when the edge of portion 35 contacts the matching curvature of the edge of arm 44 where it merges with the cylindrical part 42. In this latter position catch 30 is fully open. It is also desirable to reduce friction at this pivot means 52 and accordingly a roller element 94 (see Figure 6) is mounted on the pivot between the spaced links 50 to roll in the slots 53.

Should the hook 19 fail to enter the slot 33 in catch 30 but nevertheless happen to move the catch to closed position as in Figure 6, it will be seen that the lockout means 86 remains in operative position such that the finger 89 will intercept inward movement of the links 50 before the latter can reach or pass through the dead center axis A. When this condition occurs, the switch 70 cannot be operated and no indication or signal given. Accordingly, the landing gear must be lowered and the latch means reset to open position by means of the release cable 20 before again attempting to retract the landing gear.

The foregoing detailed description of a preferred embodiment of the invention should be taken in an instructive and not a limiting sense. Obviously certain modifications and changes may be made herein without departing materially from the spirit and intended scope of the invention as defined by the claims hereto appended.

What is claimed is:

1. An indicating type latch mechanism comprising a frame, a catch pivotally mounted on said frame for movement between an open and a closed position, toggle means for securing said catch in closed position including an operating link pivoted on said frame, an idler link pivotally connected to said operating link and to said catch, and a spring connected to said catch and to the first mentioned pivotal connection, said spring being adapted to move said first mentioned pivotal connection through dead center position with respect to said operating link pivot and said idler link connection with said catch when the latter is pivoted to closed position, and means on said operating link for moving said links through dead center position in a reverse direction for releasing said catch for movement to open position, and means responsive to movement of said operating link for indicating the position of said catch when in closed position.

2. An indicating type latch mechanism comprising in combination a frame, a bifurcated catch pivotally mounted on said frame for movement between an extended open position and a retracted closed position with respect to said frame, toggle means operatively associated with said catch for effecting the securement thereof when in retracted closed position, said means including a first link pivoted on said frame, a second link pivotally connected to said first link and to said catch, said first and second links being movable to either side of an extended dead center relation, and a spring connected to said catch and to the pivotal connection between said first and second links for urging said links to one side of their extended dead center relation for securing said catch in closed position, means for moving said links to the opposite side of their extended dead center relation for releasing said catch, and means responsive to movement of said first link in a direction to secure said catch for indicating when said catch has been secured.

3. A mechanism for latching a relatively movable element in one position of the latter, said mechanism comprising: a pivoted catch provided with a recess in which said element is engaged as it approaches said one position and in which said element is held as the catch pivots into latching position, a toggle pivoted for movement from a folded position to an extended position upon movement of the catch to latching position, said toggle when so extended holding the catch against releasing movement, a member pivoted to the catch and arranged to extend into the path of extension movement of the toggle when said element is not engaged in said recess, said member being pivotally displaced from said path by said element when the latter is engaged in the recess, and means for initiating folding movement of the toggle to provide for release of the mechanism.

4. A mechanism for latching a relatively movable element in one position of the latter, said mechanism comprising: a pivoted catch provided with a recess in which said element is engaged as it approaches said one position and in which said element is held as the catch pivots into latching position, a toggle pivoted for movement from a folded position to an extended position upon movement of the catch to latching position, said toggle when so extended holding the catch against releasing movement, and a member pivoted to the catch and arranged to extend into the path of extension movement of the toggle when said element is not engaged in said recess, said member being pivotally displaced from said path by said element when the latter is engaged in the recess.

5. A mechanism for latching a relatively movable element in one position of the latter, said mechanism comprising: a pivoted catch provided with a recess in which said element is engaged as it approaches said one position and in which said element is held as the catch pivots into latching position, a first member pivoted for movement from an idle position to an operative position upon movement of the catch to latching position, said first member being arranged in said operative position to hold the catch against releasing movement, and a second member pivoted to the catch and arranged to extend into the path of movement of the first member into operative position when said element is not engaged in said recess, said second member being pivotally displaced from said path by said element when the latter is engaged in the recess.

6. A mechanism for latching a relatively movable element in one position of the latter, said mechanism comprising: a pivoted catch provided with a recess in which said element is engaged as it approaches said one position and in which said element is held as the catch pivots into latching position, a first member mounted for movement from an idle position to an operative position upon movement of the catch to latching position, said first member being arranged when in said operative position to hold the catch against releasing movement, and a second movable member arranged to extend into the path of movement of the first member into its operative position when said element is not engaged in said recess, said second member being displaced from said path by said element when the latter is engaged in the recess.

7. A mechanism for latching a relatively movable element, said mechanism comprising: a catch movable into latching relation with said element, a toggle pivoted for movement from a folded position to an extended position upon movement of the catch to latching position, said toggle being arranged when so extended to hold the catch against releasing movement, and a member pivoted to the catch and arranged to extend into the path of extension movement of the toggle when said element is not engaged by the catch, said member being pivotally displaced from said path by said element when the latter is engaged by the catch.

8. A mechanism for latching a relatively movable element to a support, said mechanism comprising: a catch movable relative to said support and to said element into latching relation with said element, a first member pivoted for movement from an idle position to an operative position upon movement of the catch to latching position, said first member being arranged when in said operative position to hold the catch against releasing movement, and a second member pivotally mounted to extend into the path of movement of said first member into its operative position when said element is not engaged by the catch, said second member being pivotally displaced from said path by said element when the latter is engaged by the catch.

9. A mechanism for latching a relatively movable element to a support, said mechanism comprising: a catch movable relative to said support and to said element into latching relation with said element, a first member mounted for movement from an idle position to an operative position upon movement of the catch to latching position, said first member being arranged when in said operative position to hold the catch against releasing movement, and a second movable member arranged to extend into the path of movement of said first member into its operative position when said element is not engaged by the catch, said second member being displaced from said path by said element when the latter is engaged by the catch.

CLARENCE E. LINN.

REFERENCES CITED

The following references are of record in the file of this patent:

UNITED STATES PATENTS

| Number | Name | Date |
| --- | --- | --- |
| 2,082,598 | Saulnier | June 1, 1937 |
| 2,116,960 | Brown et al. | May 10, 1938 |
| 2,333,132 | Waseige | Nov. 2, 1943 |
| 2,346,797 | Stephens | Apr. 18, 1944 |
| 2,351,284 | Overbeke | June 13, 1944 |

FOREIGN PATENTS

| Number | Country | Date |
| --- | --- | --- |
| 428,539 | Great Britain | May 15, 1935 |
| 475,656 | Great Britain | Nov. 23, 1937 |